UNITED STATES PATENT OFFICE.

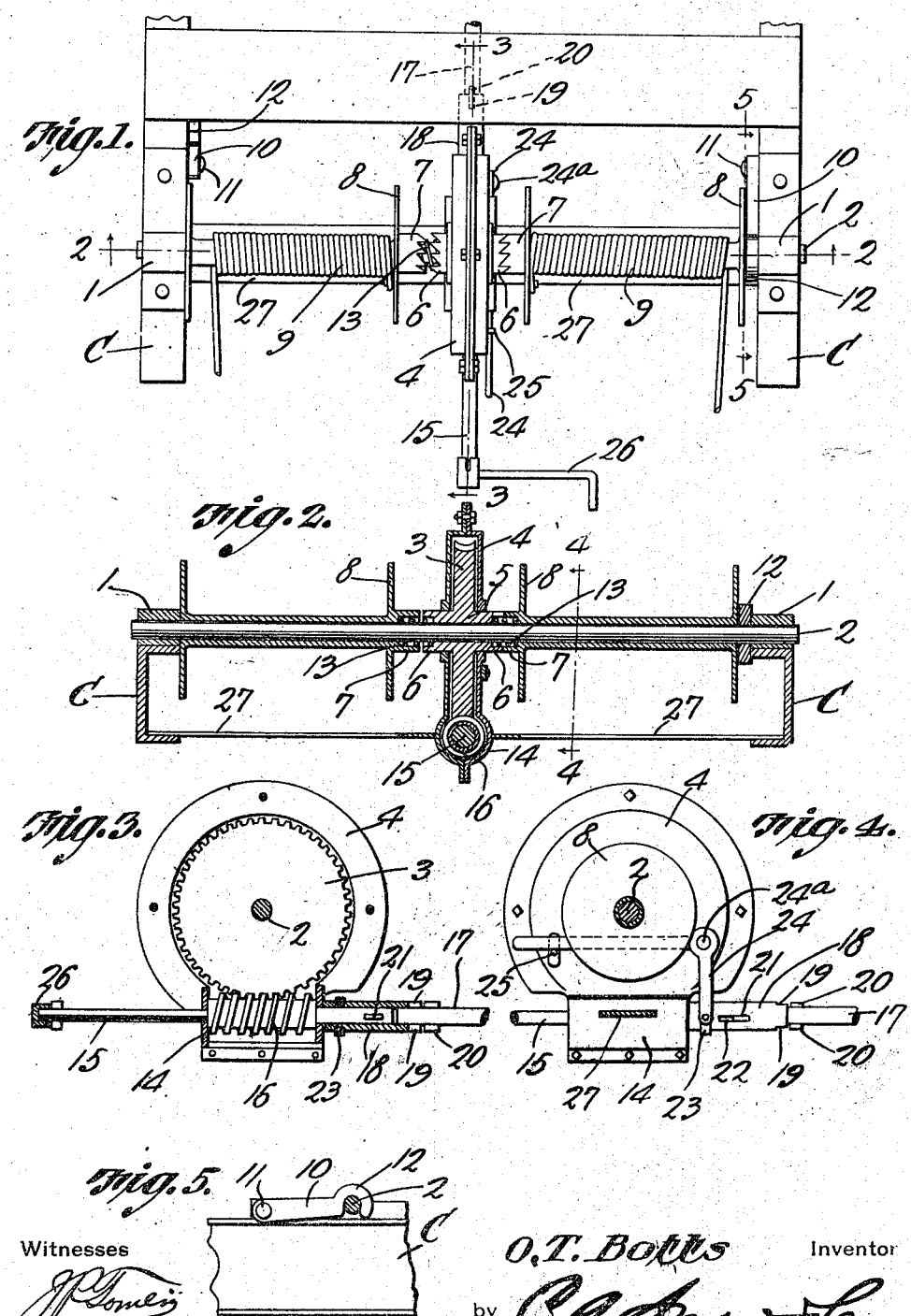

OSCAR T. BOTTS, OF BROOKFIELD, MISSOURI.

AUTOMOBILE ATTACHMENT.

1,166,575.  Specification of Letters Patent.  Patented Jan. 4, 1916.

Application filed July 14, 1915. Serial No. 39,856.

*To all whom it may concern:*

Be it known that I, OSCAR T. BOTTS, a citizen of the United States, residing at Brookfield, in the county of Linn and State of Missouri, have invented a new and useful Automobile Attachment, of which the following is a specification.

The present invention appertains to automobile attachments and relates more particularly to an appliance for enabling the automobile or motor vehicle to be pulled or extricated from a rut, or out of the depression, mud or sand in which the machine is stuck.

It is the object of the invention to provide a novel and improved pulling mechanism adapted to be assembled with the motor vehicle in an advantageous and desirable manner, to enable the machine to extricate itself when circumstances necessitate it.

It is also within the scope of the invention to provide an attachment of the nature indicated which is simple, compact and inexpensive in construction, which may be readily assembled with various motor vehicles, and which will fill its office in a thoroughly practical, convenient and efficient manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:—

Figure 1 is a plan view of the device. Figs. 2 and 3 are sectional views on the lines 2—2 and 3—3, respectively, of Fig. 1.
Fig. 4 is a sectional view on the line 4—4 of Fig. 2. Fig. 5 is a sectional view on the line 5—5 of Fig. 1.

In carrying out the invention a pair of bearings 1 are secured in any suitable manner upon the chassis or frame C of the motor vehicle adjacent the forward end thereof, and a transverse shaft 2 is carried by the bearings 1. A worm wheel 3 is mounted upon the intermediate portion of the shaft 2 and is inclosed in a suitable case 4, the hub 5 of the worm wheel 3 being journaled through the sides of the case 4. The hub 5 is provided at its opposite ends with clutch portions 6 coöperating with clutch portions 7 of a pair of reels or drums 8 mounted for rotation upon the shaft 2 between the case 4 and the bearings 1. It is to be understood, however, that instead of employing two reels, one of them may be eliminated, together with the accompanying parts, although it is desirable in certain instances, to employ the two reels, especially upon heavy motor trucks. A suitable cable 9 is wound upon each reel 8.

In order to hold the reels 8 in engagement with the clutch hub of the worm wheel 3, so that the reels will rotate with said wheel, two arms 10 are pivoted, as at 11, to the chassis C and are provided at their free ends with hooks 12 seatable upon the shaft 2 between the bearings 1 and the remote ends of the reels. When the arms 10 are swung upwardly and rearwardly, the reels 8 can separate or move outwardly against the bearings 1, under the influence of coiled wire expansion springs 13 disposed between the reels and the worm wheel. The springs 13 are preferably employed, although they may be eliminated, if desired. When the reels 8 are moved outwardly against the bearings 1, the clutch portions 7 thereof are disengaged from the clutch portions 6, so that the reels 8 will remain idle, or may be rotated without interference.

The case 4 is provided with a lower cylindrical portion 14 through which a short shaft 15 is journaled, a worm 16 being secured upon the shaft 15 and meshing with the worm wheel 3. The shaft 15 is in alinement with and extends to the end of the crank shaft 17 of the engine (not shown) whereby the shaft 15 may be connected with the crank shaft for starting the engine and for enabling the engine to operate the present mechanism.

A sleeve or clutch member 18 is slidable upon the rear protruding end of the shaft 15 and is movable over the end of the crank shaft 17, the rear end of the sleeve 18 having notches or slots 19 for receiving the lugs 20 carried by the shaft 17, when the sleeve 18 is moved rearwardly. The sleeve 18 is caused to rotate with the shaft 15, since the shaft 15 has outstanding lugs 21 working in longitudinal slots 22 provided in the sleeve 18. When the sleeve 18 is moved forwardly, the shafts 15 and 17 are disconnected, and when the sleeve is moved rearwardly, said shafts are connected to rotate together.

As a means for sliding the sleeve or clutch member 18, the ring 23 is mounted upon the sleeve 18 so that the ring 23 moves with the sleeve 18, and so that the sleeve can rotate within said ring, and a bell crank or L-shaped lever 24 at one end pivotally connected to the ring 23. The elbow or the lever 24 is fulcrumed at 24ᵃ to one side of the case 4, and the other arm of the lever 24 extends forwardly in order that it may be swung by hand. The said side of the case has an outstanding pin 25 coöperating with the arm or handle of the lever 24, said arm or handle being resilient in order that it may be sprung outwardly to allow it to move past the pin 25. The handle of the lever 24 may be engaged above or below the pin 25 for holding the sleeve 18 either out of engagement or in engagement with the shaft 17.

The forward end of the shaft 15 is preferably provided with a crank 26 for enabling the engine to be cranked or started, and the portion 14 of the case 4 is preferably connected by stays or braces 27 to the chassis C for strengthening the structure.

Ordinarily, the arms 10 are swung rearwardly, to disengage the reels 8 from the worm wheel 3, and the sleeve 18 is disengaged from the shaft 17. Should the automobile become stuck in the mud, sand, or the like, one or both of the cables may be unwound and fastened to a tree, or otherwise anchored to an object in front of the vehicle, the reels 8 rotating freely to allow the cables to be unwound. Then, the reels 8 are moved inwardly into engagement with the clutch hub of the worm wheel 3, and the arms 10 are swung forwardly and downwardly to hold the reels engaged to the worm wheel. Then, by operating the lever 24, the sleeve or clutch member 18 may be moved rearwardly into engagement with the shaft 17, and then when the engine is started, the worm 16 will be rotated by the crank or driving shaft 17, for slowly rotating the worm wheel 3. This will cause the cable or cables to be wound upon the reel or reels and the car will therefore be pulled or extricated out of the rut. After the engine is able to progress without aid, the cables 9 are detached and are again wound upon the reels 8, and the sleeve 18 is disengaged from the shaft 17, in which event the vehicle is again ready to proceed.

Having thus described the invention, what is claimed is:—

1. The combination with the chassis and crank shaft of a motor vehicle, of a transverse shaft carried by the forward end of the chassis, a reel slidable upon said shaft, a worm wheel carried by said shaft, the worm wheel and reel having coöperating clutch portions, a member pivoted to the chassis to swing between the chassis and reel for holding the reel in engagement with the worm wheel, a shaft alining with the crank shaft and having a worm meshing with said worm wheel, and means for connecting and disconnecting the last named shaft with the crank shaft.

2. The combination with the chassis and crank shaft of a motor vehicle, of a transverse shaft carried by the chassis adjacent the forward end, a reel slidable upon said shaft, a case, a worm wheel mounted upon said shaft and disposed within the said case, the worm wheel having a clutch hub engaged through the case, the reel having a clutch portion engageable with said clutch hub, means for holding the reel in engagement with said clutch hub, a worm shaft journaled through the case in alinement with the crank shaft and having a worm meshing with said worm wheel, a clutch member slidable upon the worm shaft and engageable with the crank shaft to connect the same, and an operating lever fulcrumed to said case and operatively connected to said sleeve for sliding it.

In testimony that I claim the foregoing as my own, I have hereto affixed my signature in the presence of two witnesses.

OSCAR T. BOTTS.

Witnesses:
C. L. Spalding,
Harry Markham.